United States Patent
Yu et al.

(10) Patent No.: US 8,025,439 B2
(45) Date of Patent: Sep. 27, 2011

(54) RADIATION DETECTOR ATTACHING AND DETACHING DEVICE

(75) Inventors: Juhyun Yu, Mito (JP); Yoshinori Sunaga, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 83 days.

(21) Appl. No.: 12/458,206

(22) Filed: Jul. 2, 2009

(65) Prior Publication Data

US 2010/0202592 A1  Aug. 12, 2010

(30) Foreign Application Priority Data

Feb. 12, 2009  (JP) .................................. 2009-029670

(51) Int. Cl.
*H05G 1/02* (2006.01)
*H01L 27/146* (2006.01)

(52) U.S. Cl. ..................... 378/189; 378/204; 250/370.09

(58) Field of Classification Search .................... 378/19, 378/189–192, 204, 210; 250/370.01, 370.08, 250/370.09; 257/433, 434, 443, 602, 619, 257/678, 684, 723–727, 731
See application file for complete search history.

(56) References Cited

U.S. PATENT DOCUMENTS

| | | | |
|---|---|---|---|
| 4,592,080 A | * | 5/1986 | Rauch et al. ..................... 378/19 |
| 6,236,051 B1 | | 5/2001 | Yamakawa et al. |
| 7,540,659 B1 | * | 6/2009 | Halsmer et al. ............... 378/189 |
| 2006/0086907 A1 | * | 4/2006 | Yokoi et al. .............. 250/370.09 |
| 2008/0159486 A1 | * | 7/2008 | Hesl et al. ..................... 378/189 |
| 2009/0279671 A1 | * | 11/2009 | Zhang ........................... 378/167 |

* cited by examiner

*Primary Examiner* — Anatasia Midkiff
(74) *Attorney, Agent, or Firm* — McGinn IP Law Group, PLLC

(57) ABSTRACT

A radiation detector attaching and detaching device, for a radiation detecting apparatus having a plurality of radiation detectors for detecting radiation and a radiation detector stand for respectively maintaining the radiation detectors in trenches arranged with a predetermined interval. The radiation detector attaching and detaching device has a pair of rotational jigs abutting against projections provided at both sides of each of the radiation detectors maintained in the radiation detector stand; and a pair of rotational members configured to be freely rotatable, the rotational members comprising the rotational jigs.

10 Claims, 12 Drawing Sheets

RADIATION DETECTOR ATTACHING AND DETACHING DEVICE

The present application is based on Japanese Patent Application No. 2009-029670 filed on Feb. 12, 2009, the entire contents of which are incorporated herein by reference.

BACKGROUND OF THE INVENTION

1. Field of the Invention

The present invention relates to a radiation detector attaching and detaching device, more particularly, to a radiation detector attaching and detaching device for a radiation detecting apparatus which detects radiations such as gamma ray (γ ray) and X ray.

2. Related Art

Various conventional radiation detectors have been known, and U.S. Pat. No. 6,236,051 discloses an example of such conventional radiation detectors. According to disclosure of U.S. Pat. No. 6,236,051, the radiation detector comprises a plurality of common electrode plates, a plurality of semiconductor cells, and a plurality of electrode plates. This radiation detector has a laminated body between two frames, one of the frames and the other one of the frames are fixed with each other by pins. Herein, the laminated body is formed by accumulating the common electrode plates, the semiconductor cells and the electrode plate, in which one common electrode plate, one semiconductor cell, one electrode plate, another semiconductor cell, another common electrode plate and the like are accumulated in this order.

According to the radiation detector disclosed by U.S. Pat. No. 6,236,051, because a pair of semiconductor cells adjacent in X-direction shares the common electrode plate, it is possible to decrease a dead zone where radiation cannot be detected, thereby improving a radiation detection efficiency.

However, in the conventional radiation detector such as the radiation detector disclosed by U.S. Pat. No. 6,236,051, a plurality of components such as common electrode plate and semiconductor cell are laminated to provide a radiation detecting apparatus. Therefore, when malfunction occurs in a part of the semiconductor cells, the entire radiation detector must be disassembled, and the semiconductor cells in which no malfunction occurs should be also detached from the radiation detector.

SUMMARY OF THE INVENTION

Accordingly, it is an object of the present invention to provide a radiation detector attaching and detaching device, by which radiation detectors can be individually attached by insertion and detached by pulling out.

According to a feature of the invention, a radiation detector attaching and detaching device, for a radiation detecting apparatus comprising a plurality of radiation detectors for detecting radiation and a radiation detector stand for respectively maintaining the radiation detectors in trenches arranged with a predetermined interval, the device comprises:

a pair of rotational jigs abutting against projections provided at both sides of each of the radiation detectors maintained in the radiation detector stand; and a pair of rotational members configured to be freely rotatable, the rotational members comprising the rotational jigs.

The radiation detector attaching and detaching device may further comprise:

a pair of support members respectively supporting the pair of rotational members, wherein the pair of support members are configured such that the pair of rotational members are attachable and detachable in a gap formed between the radiation detectors and the radiation detector stand by a cutout of each of the radiation detectors.

In the radiation detector attaching and detaching device, one of the pair of rotational members and the other of the pair of rotational members may be provided to be rotatable in association with each other.

In the radiation detector attaching and detaching device, the pair of rotational jigs may abut against the projections of one of the radiation detectors in accordance with rotation of the pair of rotational members.

In the radiation detector attaching and detaching device, the pair of rotational jigs may contact with the projections of the one of the radiation detectors and each of the rotational jigs is formed to have a width which does not contact with projections of the other radiation detector adjacent to the one of the radiation detectors.

In the radiation detector attaching and detaching device, each of the rotational members may comprise a rotational gear connected to a rotational shaft, and each of the rotational jigs is rotated by the rotational shaft.

In the radiation detector attaching and detaching device, wherein the rotational jigs may abut against the projections from un upper side of the projections when inserting each of the radiation detectors, and the rotational jigs abut against the projections from a lower side of the projections when inserting each of the radiation detectors.

ADVANTAGES OF THE INVENTION

According to the present invention, it is possible to provide a radiation detector attaching and detaching device, by which radiation detectors can be individually attached by insertion and detached by pulling out.

BRIEF DESCRIPTION OF THE DRAWINGS

Next, a preferred embodiment according to the invention will be explained in conjunction with appended drawings, wherein.

DETAILED DESCRIPTION OF THE PREFERRED EMBODIMENT

Next, a preferred embodiment according to the present invention will be explained in more detail in conjunction with appended drawings.

Preferred Embodiment

Figure 1A:
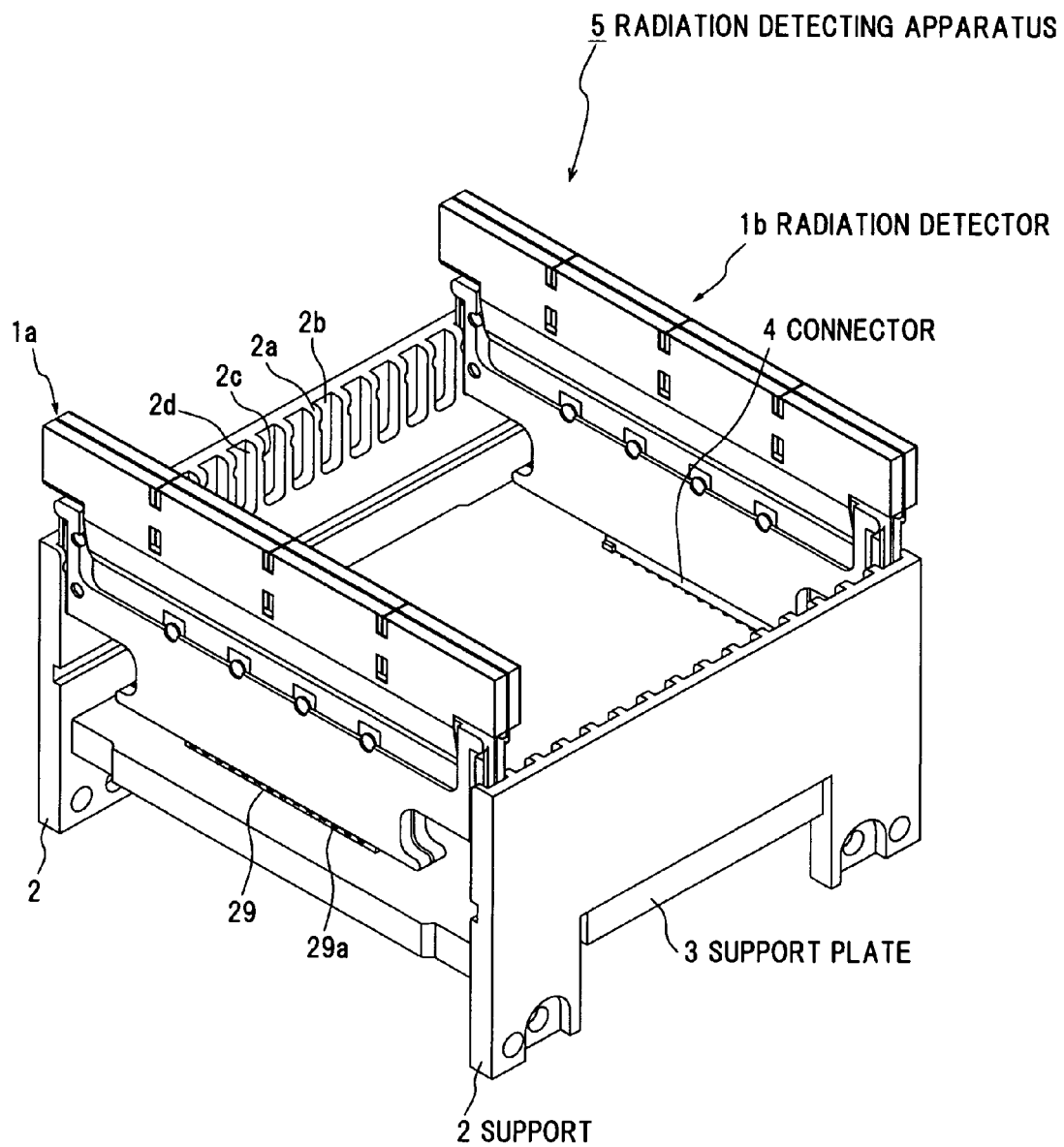
FIG. 1A is a schematic view of a radiation detecting apparatus using a radiation detector attaching and detaching device in an embodiment according to the present invention.

FIG. 1A is a schematic view of a radiation detecting apparatus using a radiation detector attaching and detaching device in an embodiment according to the present invention.
(Brief Summary of a Radiation Detecting Apparatus 5)

A radiation detecting apparatus 5, for which the radiation detector attaching and detaching device in the embodiment according to the present invention is used, is composed by maintaining a plurality of radiation detectors 1 by a radiation detector stand 6. In more concrete, the radiation detecting apparatus 5 is composed by maintaining the radiation detectors 1 in the radiation detector stand 6, which comprises a plurality of supports 2 having a plurality of trenches 2b into which the radiation detectors 1 are respectively inserted, the supports 2 being arranged at a specified interval corresponding to an interval for arranging the radiation detectors, a support plate 3 for mounting the supports 2, and a plurality of connectors 4 located between the supports 2, in which a pattern 29a of a card-edge 29 in each of the radiation detector 1 is electrically connected to an exterior control circuit.

The radiation detectors 1 are respectively inserted into the trenches 2b located between a plurality of wall portions 2a of the supports 2, so that the radiation detector 1 is fixed by being pressed to a flat side 2d by an elastic member located between a depression 2c and the radiation detector 1. Thereby, the radiation detecting apparatus as shown in FIG. 1A is composed. Herein, although only a radiation detector 1a and a radiation detector 1b are shown in FIG. 1A, for convenience sake of explanation, the radiation detectors 1 are respectively inserted into the trenches 2b between the radiation detector 1a and the radiation detector 1b. Furthermore, for showing the card-edge 29 of the radiation detector 1a, the connector 4 provided at a lower side of the radiation detector 1a is not shown.

Still further, a collimator (not shown) having openings through which the radiation passes is provided at an opposite side of the support plate 3 for the radiation detectors 1. The radiation detectors 1 detect the radiation through the openings of the collimator. As an example, each of the openings of the collimator is formed into a roughly-quadrangular shape. A size of each of the openings is 1.2 mm on a side, and the respective openings are arranged in a matrix shape with a pitch of 1.4 mm. Therefore, in the collimator, a thickness of the wall which separates one opening from the other opening is 0.2 mm.
(Brief Summary of the Radiation Detector 1)

Figure 1B:
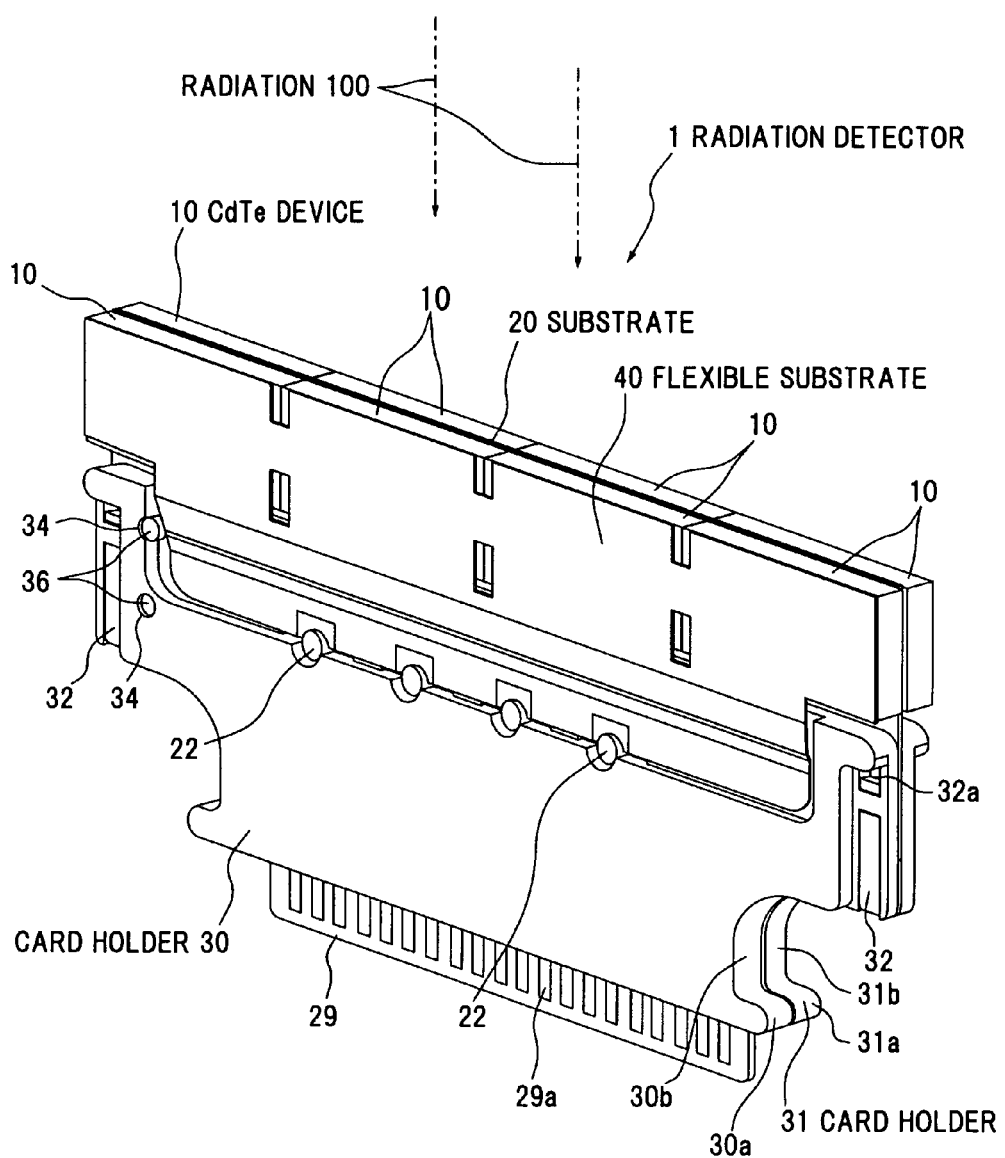
FIG. 1B is a perspective view of a radiation detector.
Figure 1C:
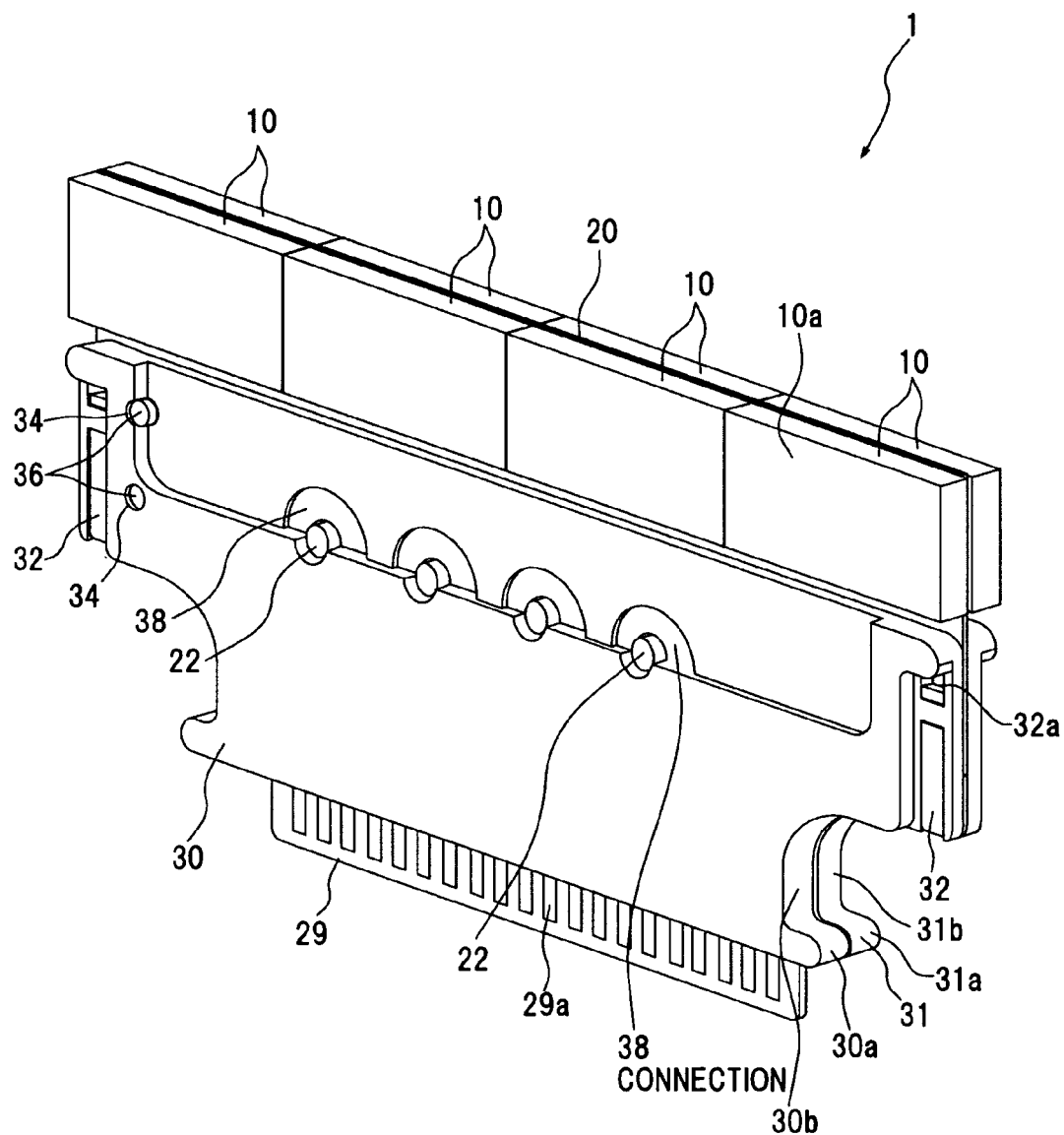
FIG. 1C is a perspective view of the radiation detector where a flexible substrate is removed.
Figure 1D:
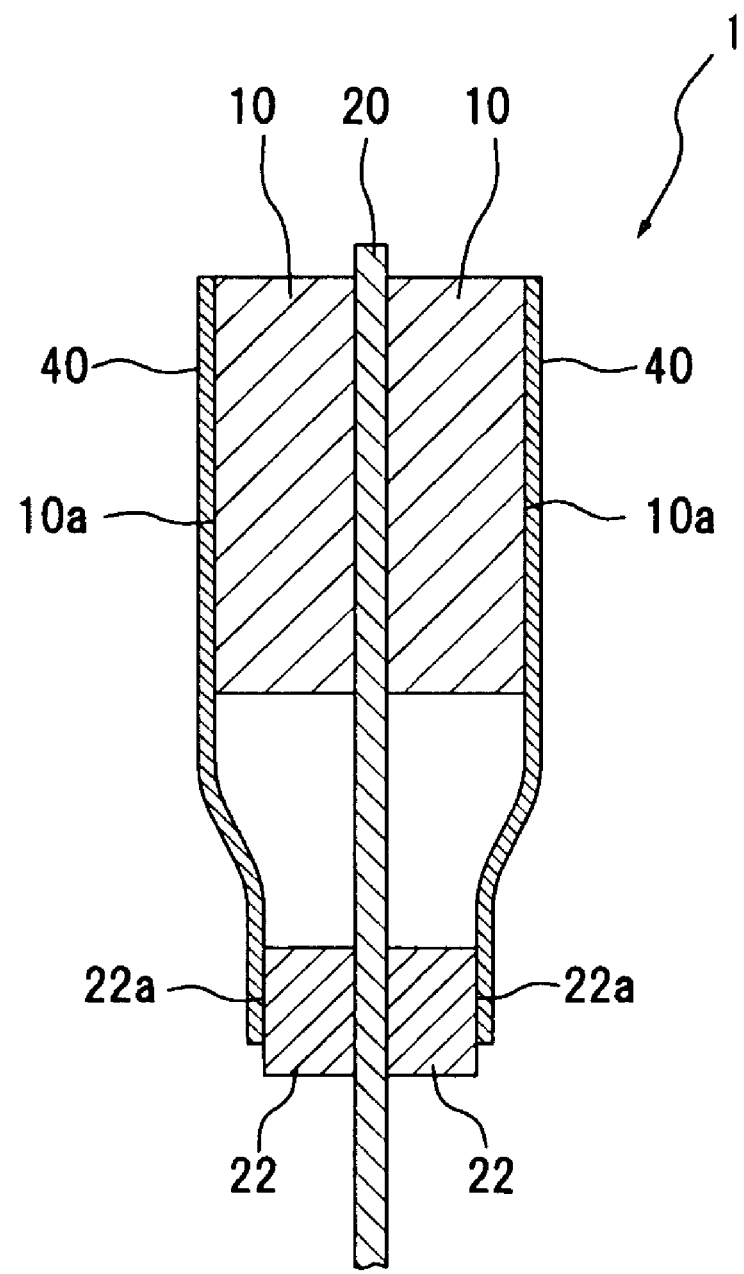
FIG. 1D is a partial cross sectional view of the radiation detector.

FIG. 1B is a perspective view of a radiation detector, FIG. 1C is a perspective view of the radiation detector where a flexible substrate is removed, and FIG. 1D is a partial cross sectional view of the radiation detector. In FIG. 1D, a card holder 30 and a card holder 31 are not shown for convenience sake of explanation.
(Brief Summary of a Structure of the Radiation Detector 1)

The radiation detector 1 is a radiation detector radiation detecting apparatus which detects radiations such as gamma ray (γ ray) and X ray. Herein, in FIG. 1B, radiation 100 propagates from an upper side to a bottom side in space. Namely, the radiation 100 propagates along a direction facing to a card holder from semiconductor devices of a radiation detector 1 and arrives at the radiation detector 1. The radiation detector 1 detects the radiation 100 at a side surface (in other words, surfaces which face to the upper side of FIG. 1B) of CdTe devices 10 as semiconductor devices. Therefore, the side surface of the CdTe devices 10 function as entrance faces of the radiation 100. In this embodiment, the radiation detector 1 is a radiation detector for a radiation detecting apparatus composed by arranging a plurality of the radiation detectors 1, each of which detects the radiation 100 through the collimator having the openings. The radiation 100 propagates along a specific direction (for example, in a direction from a test subject to the radiation detector 1) and through the openings of the collimator. The radiation detector 1 shows e.g. a card shape.

The radiation detector 1 may comprise a collimator. Alternatively, the radiation detector 1 may comprise no collimator. For the case of using the collimator, a parallel multihole collimator, a pinhole collimator or the like may be used as the collimator. In this embodiment, as an example, the parallel multihole collimator is used as the collimator.

In more concrete, with referring to FIG. 1B, the radiation detector 1 comprises a pair of CdTe devices 10 as a pair of semiconductor devices which can detect the radiation 100 through the openings of the collimator, a thin substrate 20 having a thickness which is substantially equal to or not greater than a thickness of a wall which separates the plurality of openings of the collimator from each other, and the card holder 30 and the card holder 31 which support the substrate 20 by sandwiching at adjacent portions of the pair of CdTe devices 10. As shown in FIG. 1B, for example, four groups of the pair of CdTe devices 10 are fixed on the substrate 20 at positions for sandwiching the substrate 20. In other words, the pair of CdTe devices 10 of each group is fixed at symmetrical positions on the substrate 20. The pair of CdTe devices 10 of each group is fixed to one surface and the other surface of the substrate 20 at plane symmetrical positions in which the substrate 20 is a plane of symmetry. For example, the substrate 20 has a thickness (for example, 0.2 mm) which is substantially equal to or not greater than a thickness of the wall which separates the openings from each other in the collimator.

The substrate 20 is supported between the card holder 30 and the card holder 31 by sandwiching. The card holder 30 and the card holder 31 are respectively formed to have the same shape. Both the card holder 30 and the card holder 31 have grooved holes 34 and projection portions 36. The projection portion 36 of the card holder 31 fits in the grooved hole 34 of the card holder 30, and the projection portion 36 of the card holder 30 (not shown) fits in the grooved hole 34 of the card holder 31 (not shown), so that the card holder 30 and the card holder 31 supports the substrate 20.

An elastic member-mounting portion 32 and a concave portion 32a are parts where elastic members are provided, and the elastic members press the radiation detector 1 to a flat side of a wall portion 2a of the radiation detector stand 6 in the case where the radiation detector 1 is inserted into the trench 2b of the radiation detector stand 6, so that the radiation detector 1 is fixed to the radiation detector stand 6. In addition, when a card-edge 29 of the radiation detector 1 is inserted into the connector 4, the connector 4 is electrically connected to a pattern 29a, and the pattern 29a is electrically connected to an exterior control circuit, an exterior power wire, and/or grounding wire.

In addition, each of the card holder 30 and the card holder 31 has projections 30a and 31a at both ends of the card-edge 29, and cutouts 30b and 31b in vicinity of the projections 30a and 31a. The projections 30a and 31a and the cutouts 30b and 31b are respectively provided at both ends of a lower side, in the case where a side equipped with the CdTe devices 10 of the radiation detector 1 is considered to be an upper side.

With referring to FIG. 1B to FIG. 1D, the radiation detector 1 further comprises a flexible substrate 40 having wiring patterns on an opposite side of the substrate 20 of a pair of the CdTe devices 10, wherein electrode patterns of each of the CdTe devices 10 and the substrate terminals 22 are electrically connected with the wiring patterns of the flexible substrate 40 (an electrode pattern of the surface of device 10a provided on the other side of the substrate 20 of the CdTe devices 10 and the wiring pattern of the flexible substrate 40 at the side of the CdTe devices 10 are not shown).

The flexible substrates 40 are provided at both one side of the CdTe device 10 of a pair of the CdTe devices 10 and the other side of the CdTe device 10 of the pair of the CdTe devices 10 (for example, the flexible substrates 40 are provided at both one side of four groups of the pair of the CdTe devices 10 and the other side of four groups of the pair of the CdTe devices 10). Respective one ends of the wiring patterns of the flexible substrate 40 are electrically connected to substrate terminals 22 at connections 38 as a plurality of flexible lead connections of the card holder 30 and the card holder 31. In more concrete, one side of wiring patterns of the flexible substrate 40 is connected to a surface of a device 10a of the CdTe devices 10 with an electrically conductive adhesive. Also, the other side of the wiring patterns of the flexible substrate 40 is connected to a terminal surface 22a of a substrate terminal 22 with the electrically conductive adhesive.

Similarly, the flexible substrate 40, which has wiring patterns connected with the electrode pattern of the other of the CdTe devices 10, covers surfaces of the other of CdTe devices 10. In addition, the CdTe devices 10 as semiconductor devices are used for detecting radiation in this embodiment, however the semiconductor devices are not limited to the CdTe devices 10 as long as the radiation such as γ ray can be detected. For example, compound semiconductor devices such as CdZnTe (CZT) devices, $HgI_2$ devices may be used as the semiconductor devices.

(Brief Summary of the Radiation Detector Stand 6)

Figure 1E:
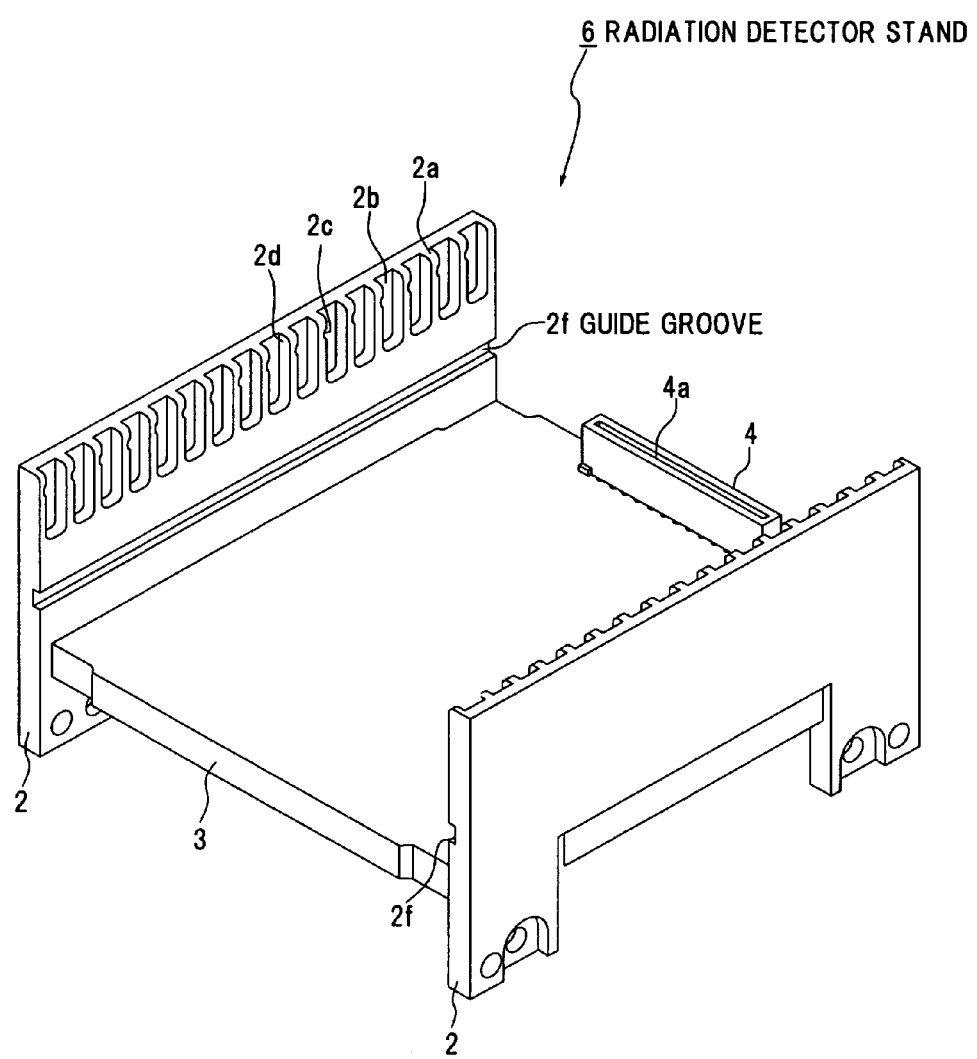
FIG. 1E is a schematic view of the radiation detector stand.

FIG. 1E is a schematic view of the radiation detector stand.

The radiation detector stand 6 is a radiation detector stand for the radiation detector 1 for the radiation detecting apparatus 5 composed by arranging a plurality of the radiation detectors 1, which detects the radiations through the collimator.

With referring to FIG. 1E, the radiation detector stand 6 comprises the support plate 3 such as a mother board, the supports 2 having the trenches 2b into which the radiation detectors 1 detecting the radiation, the supports 2 are arranged at the specified intervals on the support plate 3, and the connectors 4 located between the supports 2 and provided with inserting portions 4a into which the radiation detectors 1 are inserted respectively. A plurality of the supports 2 are arranged parallel to one another at a regular interval according to a width of the radiation detector 1. A plurality of the trenches 2b are arranged at a predetermined interval corresponding to an interval of arranging the radiation detectors 1, and the trenches 2b are formed along a horizontal direction with respect to a normal direction of a surface of the support plate 3. The predetermined interval is greater than the width of the radiation detector 1 (specifically, a total of a width of the card holder 30, a width of the card holder 31, and a width of a substrate 20 described below).

In addition, each of the supports 2 comprises a guide groove 2f at a side where the radiation detector 1 is inserted, i.e. at a side where the trench 2b is provided, and the radiation detector attaching and detaching device in this embodiment is inserted into the guide groove 2f. The details thereof will be described below. In addition, only one connector 4 is shown in FIG. 1E for convenience sake of explanation, however a plurality of the connectors 4 are arranged to be aligned on the support plates 3 corresponding to respective positions of the trenches 2b in this embodiment. Further, the support 2 may comprise the trenches 2b on the other surface as well as one surface. For this case, the radiation detecting apparatus 5 may be such configured that the radiation detectors 1 are arranged in an array of n-rows and m-columns (n and m are positive integers).

Figure 1F:
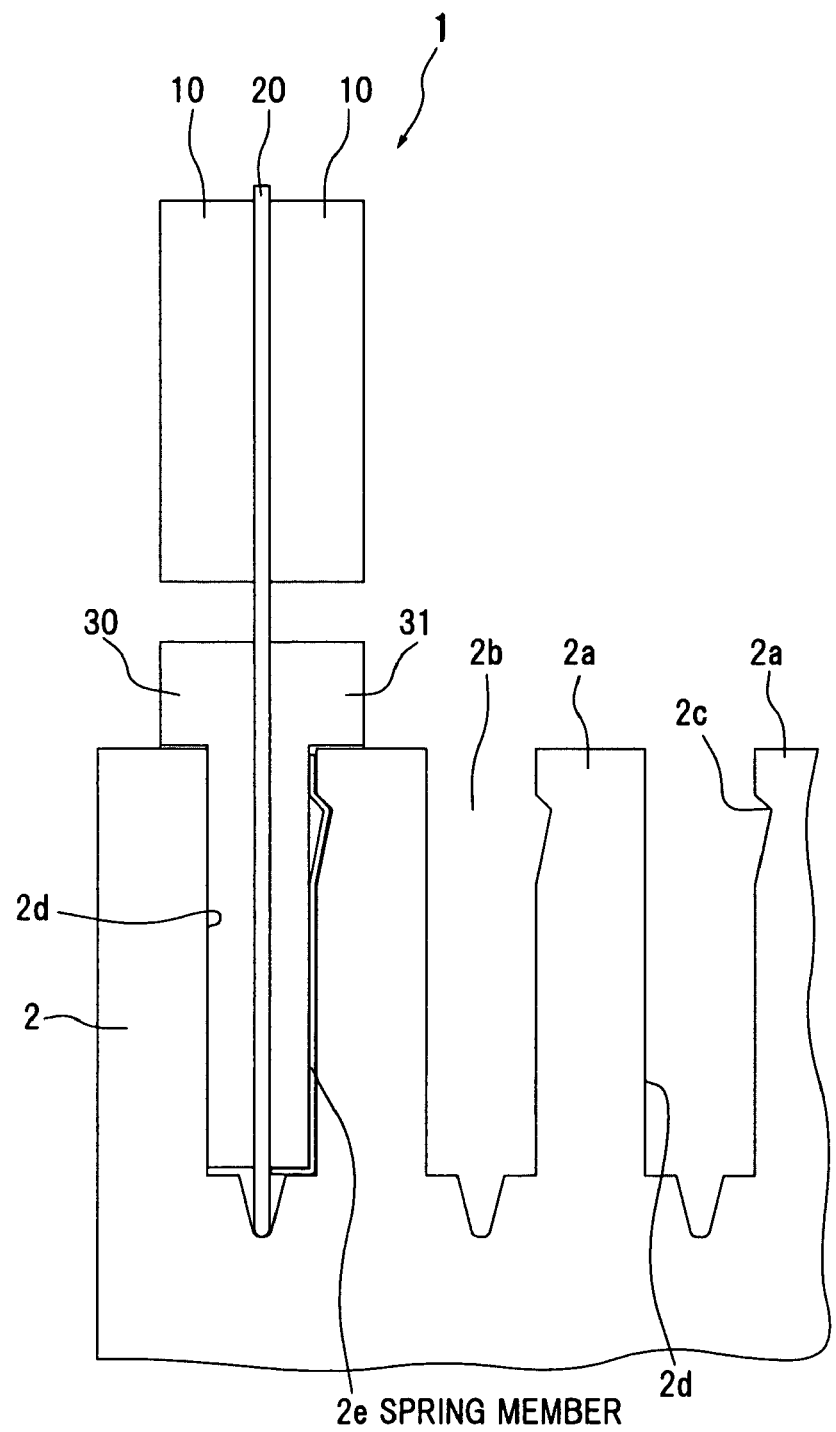
FIG. 1F is a schematic diagram of a side face of the support of the radiation detector stand into which the radiation detector is inserted.

FIG. 1F is a schematic diagram of a side face of the support of the radiation detector stand into which the radiation detector is inserted.

The supports 2 are placed on the support plate 3 to be distant from each other with an interval corresponding to the width of the radiation detector 1. As shown in FIG. 1F, the supports 2 respectively have a plurality of the wall portions 2a, and the trenches 2b are formed between the wall portions 2a. In other words, each of the supports 2 has comb-like the wall portions 2a. A depression 2c as a locking depression is formed on one surface of the wall portion 2a, and the other surface opposed to the one surface of the wall portion 2a is provided as a flat side 2d. The depression 2c contains a first slope which slopes inward the wall portion 2a, and a second slope having a sharper inclination and a shorter slope than those of the first slope, and the second slope is formed to be more distant from the support plate 3 than the first slope.

Herein, a spring member 2e is incorporated in the elastic member-mounting portion 32. For example, the spring member 2e is provided as an elastic member comprising a metal plate, which can be formed thinner than a resin spring and be excellent in radiation durability and mechanical endurance. The spring member 2e is formed to have a shape corresponding to an outer surface of the depression 2c. When the radiation detector 1 is inserted in the trenches 2b of the supports 2, the radiation detector 1 is pressed to the flat side 2d of the wall portion 2a. Specifically, the spring members 2e press the card holder 30 and the card holder 31 of the radiation detector 1 to the flat side 2d. As a result, the radiation detector 1 is fixed to the support 2. Because of being pressed the radiation detector 1 to the flat side 2d, each position of the radiation detectors 1 to the support 2 can be determined or controlled based on the position of each flat side 2d to support 2. Namely, the position of the radiation detector 1 can be controlled by the flat side 2d as a reference surface.

In addition, because the inclination of the second slope of the depression 2c is sharper than that of the first slope, it is possible to prevent the radiation detector 1 from dropping off the support 2 after inserting the radiation detector 1 in the trench 2b. Further, because the inclination of the first slope is gentler than that of the second slope, it is possible to easily insert the radiation detector 1 in the trench 2b. Still further, the depressions 2c are respectively formed on the surface of the wall portions 2a, for example, in the same direction. By adjusting an elastic force of the spring member 2e, it is possible to control a force by which the spring member 2e fixes the radiation detector 1 to the support 2.

Each of the supports 2 is formed from a metal material with means of processing such as die-casting, cutting work, sheet metal processing, wire-cut, and laser material processing. For example, the support 2 having the wall portions 2a with the depressions 2c is formed by cutting work of the metal material. Because the support 2 is formed by cutting work of the metal material, a distance from the flat side 2d of one of the wall portions 2a to the flat side 2d of the other wall portion 2a located next to the one of the wall portions 2a can be controlled at least within a range of the dimension error of ±0.05 mm. The dimension error is, for example, ±0.02 mm when the cutting work is used, and the dimension error is ±0.01 mm when the wire-cut is used. Further, the dimension error can be reduced to ±0.05 mm when the support 2 is formed by the die-casting.

The support 2 may be also formed by the combination of the cutting work and the sheet metal processing of the metal material. In addition, it is preferable to use the metal material with high thermal conductivity, light weight, and high mechanical strength, which can be manufactured with high dimensional accuracy for the support 2, for example, aluminum.

Figure 1G:
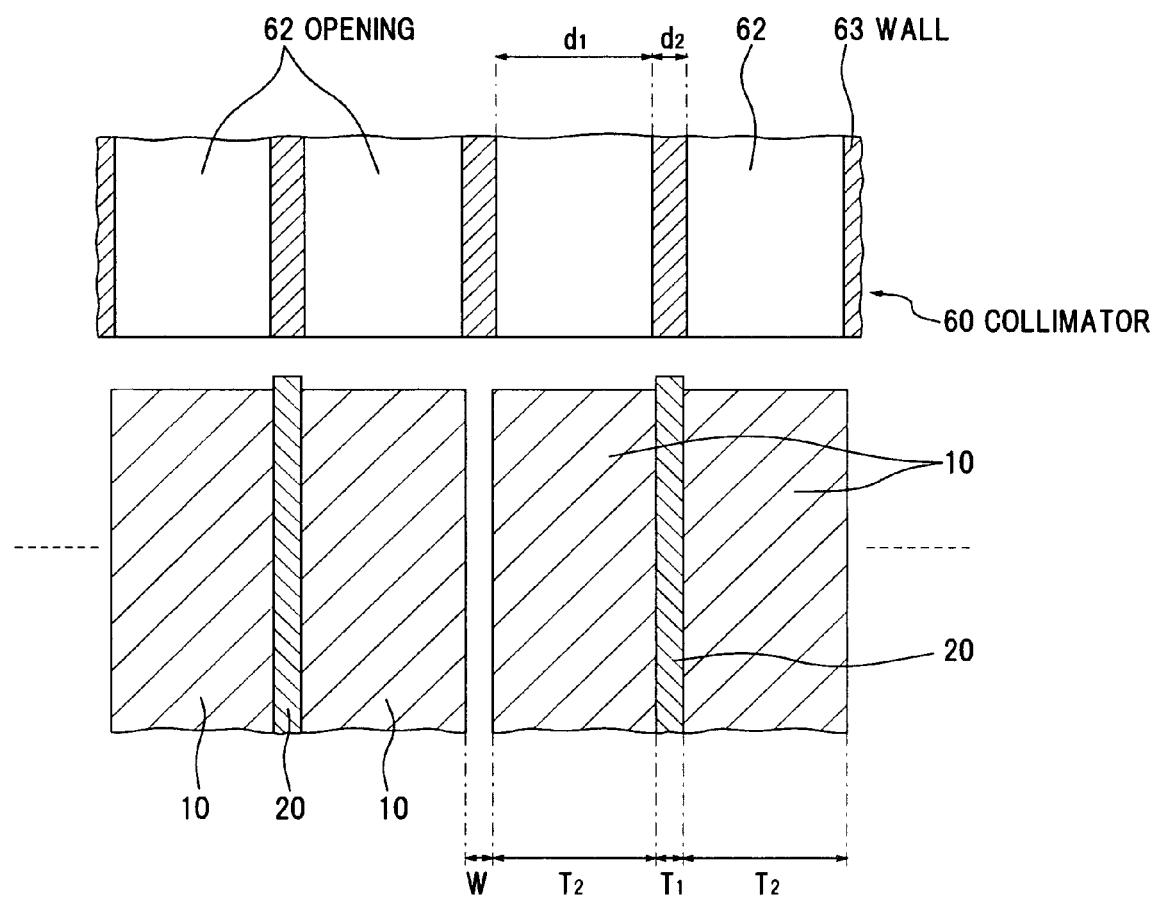
FIG. 1G is a schematic partial cross sectional view of the radiation detectors with a collimator when the radiation detectors are inserted in and fixed to the radiation detector stand.

FIG. 1G is a schematic partial cross sectional view of the radiation detectors with a collimator when the radiation detectors are inserted in and fixed to the radiation detector stand in the embodiment according to the present invention. In addition, in FIG. 1G, the flexible substrates are not shown for convenience sake of explanation.

Each of the radiation detectors 1 is inserted into each of the trenches 2b, and the radiation detector 1 is pressed to the support 2 by the spring member 2e located between the trench 2b and the elastic member-mounting portion 32, to provide the radiation detecting apparatus 5 in which a plurality of the radiation detectors 1 are laterally arranged in high density. As shown FIG. 1G, a collimator 60 is placed over the radiation detectors 1 to cover the radiation detectors 1. When using the collimator 60, it is required that each position of a plurality of openings 62 of the collimator 60 corresponds to each position of a plurality of pixels of the CdTe device 10.

Each of the CdTe devices 10 comprises a plurality of regions (i.e. pixel) which detect the radiation at a face to which the radiation is incident. When walls 63 which separate the openings 62 of the collimator 60 from each other are located at positions of the pixels, the walls 63 are located on the pixels, so that it is impossible to appropriately detect the radiation by these pixels. Therefore, it is required that each position of a plurality of openings 62 of the collimator 60 corresponds to each position of a plurality of pixels. Therefore, in order to prevent an area of the pixels of the CdTe devices 10 from being covered with the walls 63 of the collimator 60, it is required to achieve high location accuracy with respect to the collimator 60 of the radiation detectors 1 by narrowing the interval between the radiation detectors 1. Further, in the case of improving the resolution of the radiation detecting apparatus 5 by diminishing each opening size $d_1$ of the openings 62 of the collimator 60, higher location accuracy is required.

Herein, because the radiation detector 1 is provided with the substrate 20 having a thickness $T_1$ which is equal to or not greater than a thickness $d_2$ of the wall 63 which separates the openings 62 of the collimator 60 from each other, an interval W between the radiation detectors 1 can be set to be not greater than the thickness $d_2$ of the wall 63. In addition, the radiation detectors 1 may be arranged closely with the high location accuracy by forming the trenches 2b of the support 2 with the location accuracy corresponding to the interval W.

The support 2 of the radiation detector stand 6 in this embodiment has the flat side 2d formed at a predetermined interval on one surface of the wall portion 2a, and the flat sides 2d are formed respectively with high dimensional accuracy. For example, in the case where the thickness $T_1$ of the substrate 20 is 0.2 mm, the thickness $T_2$ of the CdTe device 10 is 1.2 mm, and the interval W between the radiation detectors 1 is 0.2 mm, the radiation detectors 1 may be arranged every 2.8 mm±0.02 mm by adjusting an interval between the flat side 2d of one wall portion 2a of the support 2 formed by cutting work of the metal material and the flat side 2d of the other wall portion 2a adjacent to the one wall portion 2a to 2.8 mm±0.02 mm.

(Details of Radiation Detector Attaching and Detaching Devices 7a and 7b)

Figure 2:
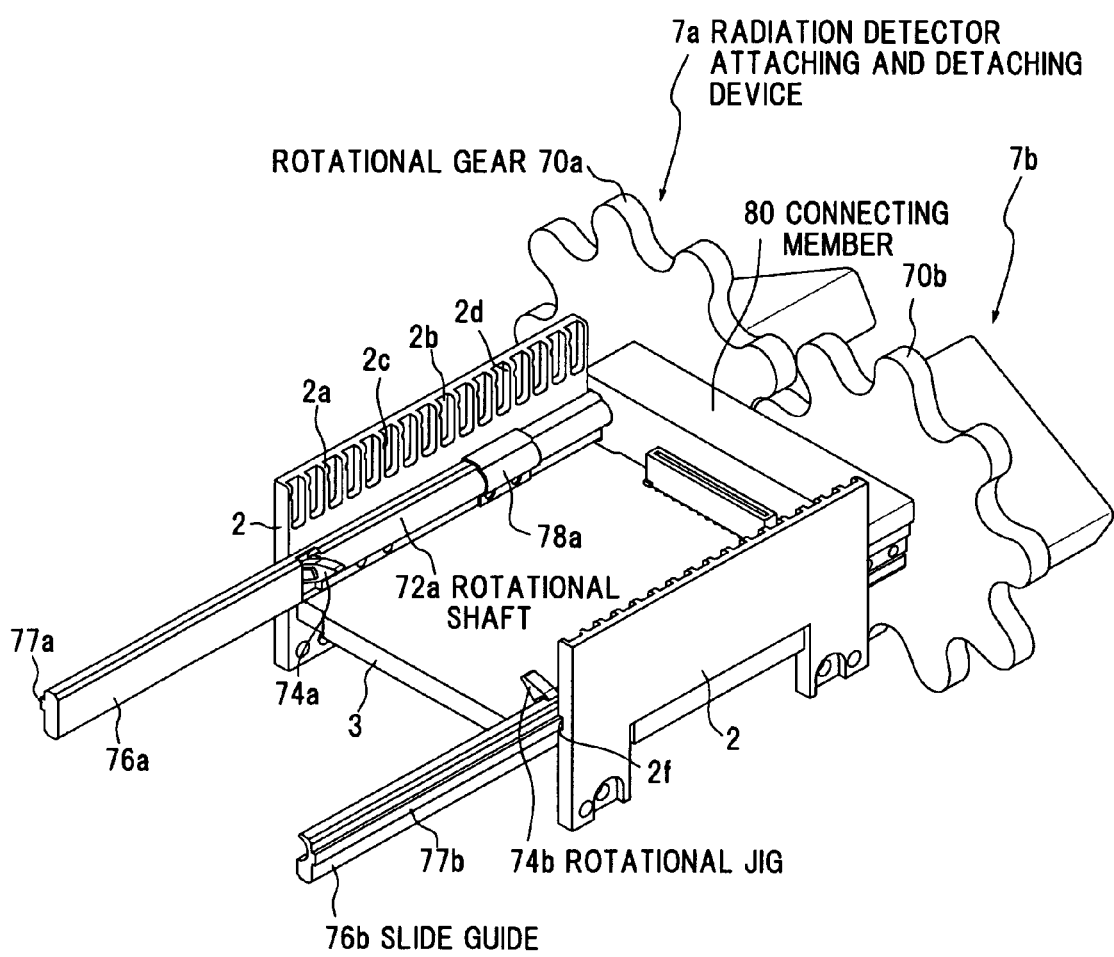
FIG. 2 is a perspective view of a radiation detector attaching and detaching device in the embodiment according to the present invention.

FIG. 2 is a perspective view of a radiation detector attaching and detaching device in the embodiment according to the present invention.

A radiation detector attaching and detaching device 7a in this embodiment comprises a rotational gear 70a as rotational member, a rotational shaft 72a connected to the rotational gear 70a to be freely rotatable in accordance with rotation of the rotational gear 70, a rotational jig 74a provided at an opposite side of the rotational shaft 72a with respect to the rotational gear 70a, a slide guide 76a including a guide projection 77a sliding along the guide groove 2f of the support 2, the slide guide 76a being inserted into a side face of the support 2 and beneath the trench 2b as a support member for supporting the rotational shaft 72a, and a slide metal plate 78a for holding the rotational shaft 72a by the slide guide 76a. The rotational jig 74a may be interlocked with the rotational shaft 72a, so that the rotational jig 74a is rotated by the rotational shaft 72a. Similarly, the radiation detector attaching and detaching device 7b comprises a rotational gear 70b, a rotational shaft 72b, a rotational jig 74b, a slide guide 76b including a guide projection 77b, and a slide metal plate 78b.

In this embodiment, the radiation detector attaching and detaching device 7a and the radiation detector attaching and detaching device 7b are paired. When inserting the radiation detector attaching and detaching devices 7a and 7b in the support 2, the radiation detector attaching and detaching devices 7a and 7b may be inserted through a connecting member 80 having a plurality of through-holes, through which the rotational shafts 72a and 72b respectively pass. For this case, the radiation detector attaching and detaching device 7a, the radiation detector attaching and detaching device 7b and the connecting member 80 may be integrally composed. Furthermore, in each of the slide guides 76a and 76b, the rotational jigs 74a and 74b are provided to be freely attachable and detachable by insertion at a gap formed between a plurality of the radiation detectors 1 and the radiation detector stand 6 by the cutouts 30b and 31b provided in each of the radiation detectors 1.

Herein, the rotational jig 74a and the rotational jig 74b respectively abut against the projections 30a and 31a as a pair of projection portions provided at both sides of the radiation detector 1 shown in FIG. 1B. In more concrete, the rotational jigs 74a and 74b abut against the projections 30a and 31a from an upper side or a lower side of the projections 30a and 31a of the radiation detector 1 in accordance with rotation of the rotational shafts 72a and 72b, so that a force in a direction of inserting into the support 2 or a direction of pulling out from the support 2 is applied to the radiation detector 1.

In addition, the rotational jig 74a and the rotational jig 74b respectively contact with a pair of the projection portions of one of the radiation detectors 1 (i.e. the projections 30a and 31a provided at one end of the radiation detector 1 ad the projections 30a and 31a provided at the other end of the radiation detector 1), and each of the rotational jig 74a and the rotational jig 74b is formed to have a width which does not contact with a pair of projection portions of the other radiation detector 1 adjacent to this radiation detector 1. In other words, a plurality of the radiation detectors 1 are arranged in the high density to be adjacent to each other in the radiation detector stand 6, each of the rotational jigs 74a and 74b is formed to have a width contacting with the projections 30a and 31a of one of the radiation detectors 1. Accordingly, the pair of the rotational jigs 74a and 74b abut against a pair of the projection portions of a particular one of the radiation detectors 1 in accordance with the rotation of the pair of the rotational shafts 72a and 72b.

In this embodiment, the rotational shaft 72a and the rotational shaft 72b (hereinafter also referred to as "a pair of rotational shafts") are provided to be freely rotatable in association with each other by the effect of the rotation of the rotational gear 70a and the rotational gear 70b in association with each other. Therefore, since the rotational shaft 72a which is one of the pair of rotational shafts rotates in cooperation with rotation of the rotational shaft 72b which is the other rotational shaft, the rotational jig 74a and the rotational jig 74b rotate in cooperation with each other. In accordance with the cooperative rotation of the rotational jig 74a and the rotational jig 74b, a force from the rotational jig 74a and a force from the rotational jig 74b are applied almost simultaneously to the projections 30a and 31a at one end of the radiation detector 1 and a force from the projections 30a and 31a at the other end of the radiation detector 1.

(Details of Insertion of the Radiation Detector 1)

Figure 3A:
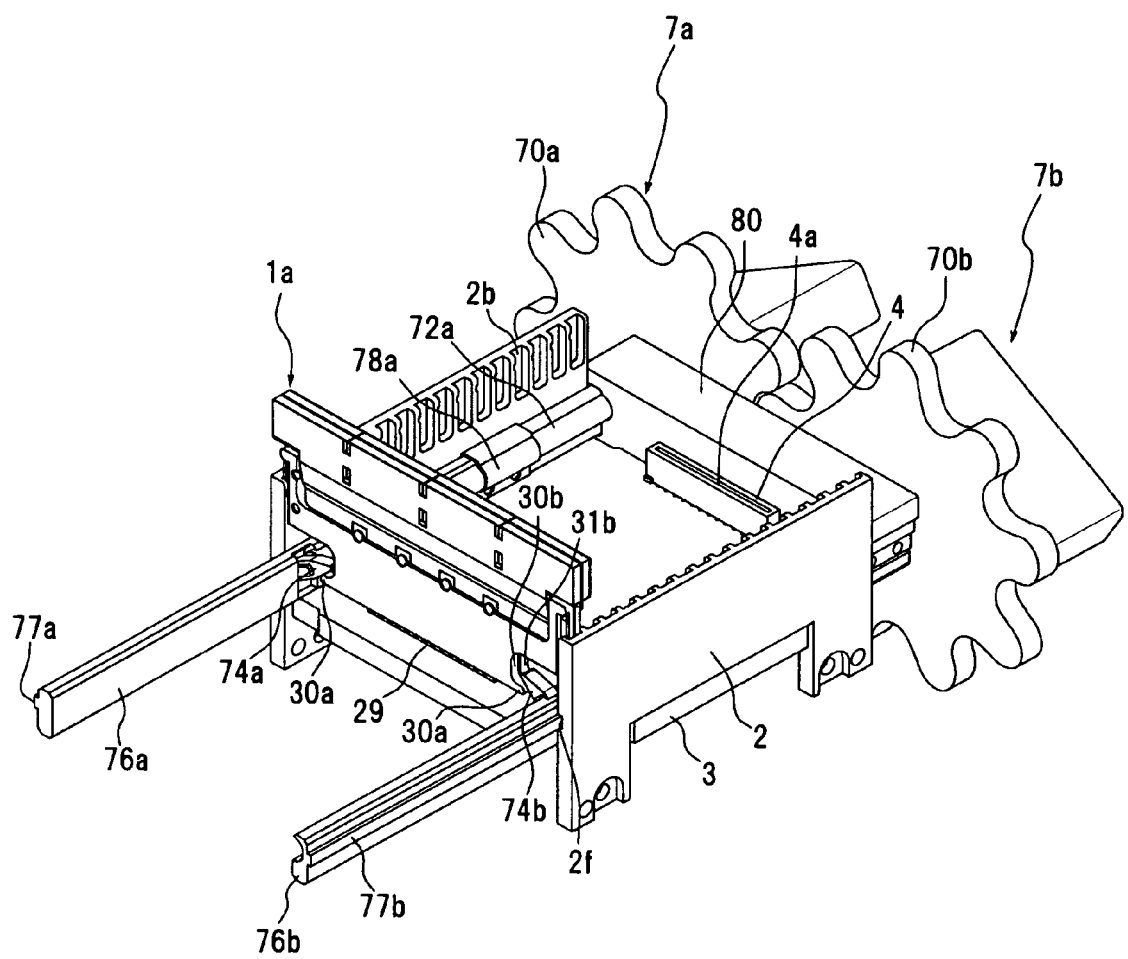
FIG. 3A is a perspective view of the radiation detector inserted into the radiation detector stand by using the radiation detector attaching and detaching device in the embodiment according to the invention.
Figure 3B:
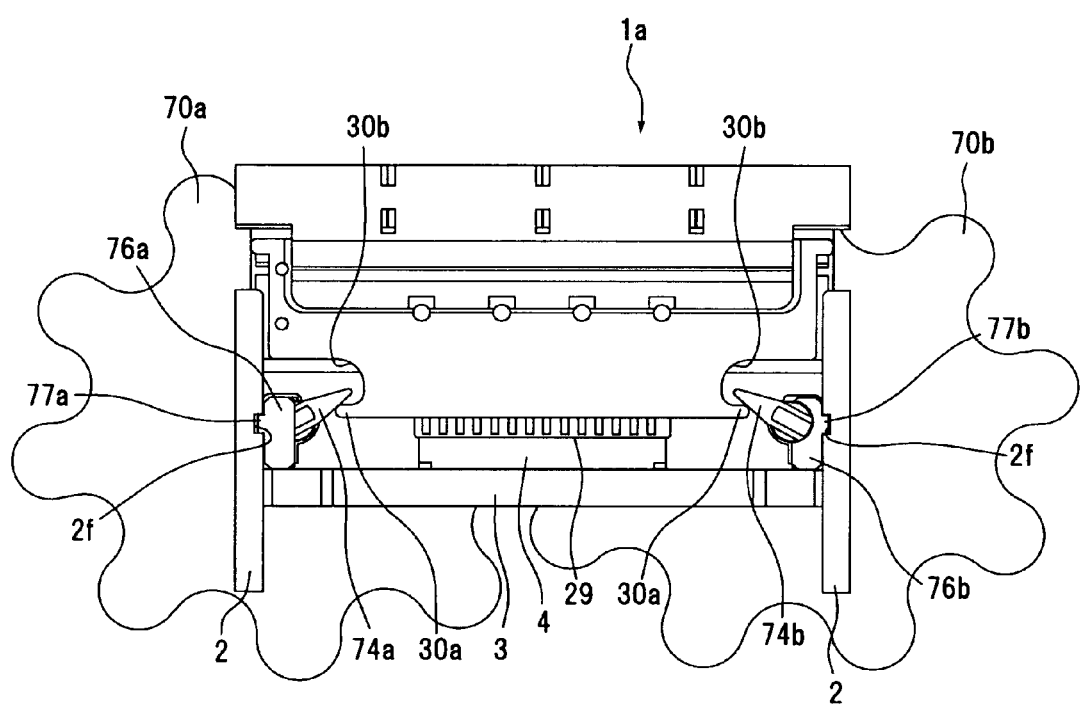
FIG. 3B is a front view of the radiation detector inserted into the radiation detector stand in FIG. 3A which is viewed from a side of the radiation detector.

FIG. 3A is a perspective view of the radiation detector inserted into the radiation detector stand by using the radiation detector attaching and detaching device in the embodiment according to the invention, and FIG. 3B is a front view of the radiation detector inserted into the radiation detector stand in FIG. 3A which is viewed from a side of the radiation detector.

In FIG. 3A and FIG. 3B, a plurality of the radiation detectors 1 except the radiation detector 1a and the connector 4 to which the radiation detector 1a is inserted are omitted for convenience sake of explanation.

At first, the slide guides 76a and 76b of the radiation detector attaching and detaching devices 7a and 7b are inserted into the gap formed between the support 2 and a plurality of the radiation detectors 1 by means of the cutouts 30b and 31b of the radiation detectors 1. An insertion amount thereof is determined such that the rotational jigs 74a and 74b are located at positions of the trenches 2b into which the radiation detector 1a to be inserted into the radiation detector stand 6 is inserted. Herein, in the case where the slide guides 76a and 76b are inserted with a predetermined insertion amount, a rotation angle of the rotational gears 70a and 70b is adjusted such that the rotational jigs 74a and 74b are located above the projections 30a and 31a of the radiation detector 1.

Next, the rotational gear 70a as one rotational member is rotated under a state that the rotational jigs 74a and 74b respectively contact with an upper side of the projection portion 30a and an upper side of the projections 31a of the radiation detector 1a. In addition, since the rotational gear 70b as the other rotational member is provided to be rotatable in association with the rotational gear 70a, both the rotational gear 70a and the rotational gear 70b can be rotated by rotating either of the rotational gear 70a and the rotational gear 70b. In accordance with the rotation of the rotational gears 70a and 70b, the rotational jigs 74a and 74b rotate in a direction to push the radiation detector 1a to a side of the support plate 3 along the trenches 2b of the supports 2. Thereby, the radiation detector 1a is inserted into the supports 2 to be fixed.

(Details of Pulling Out of the Radiation Detector 1)

Figure 4A:
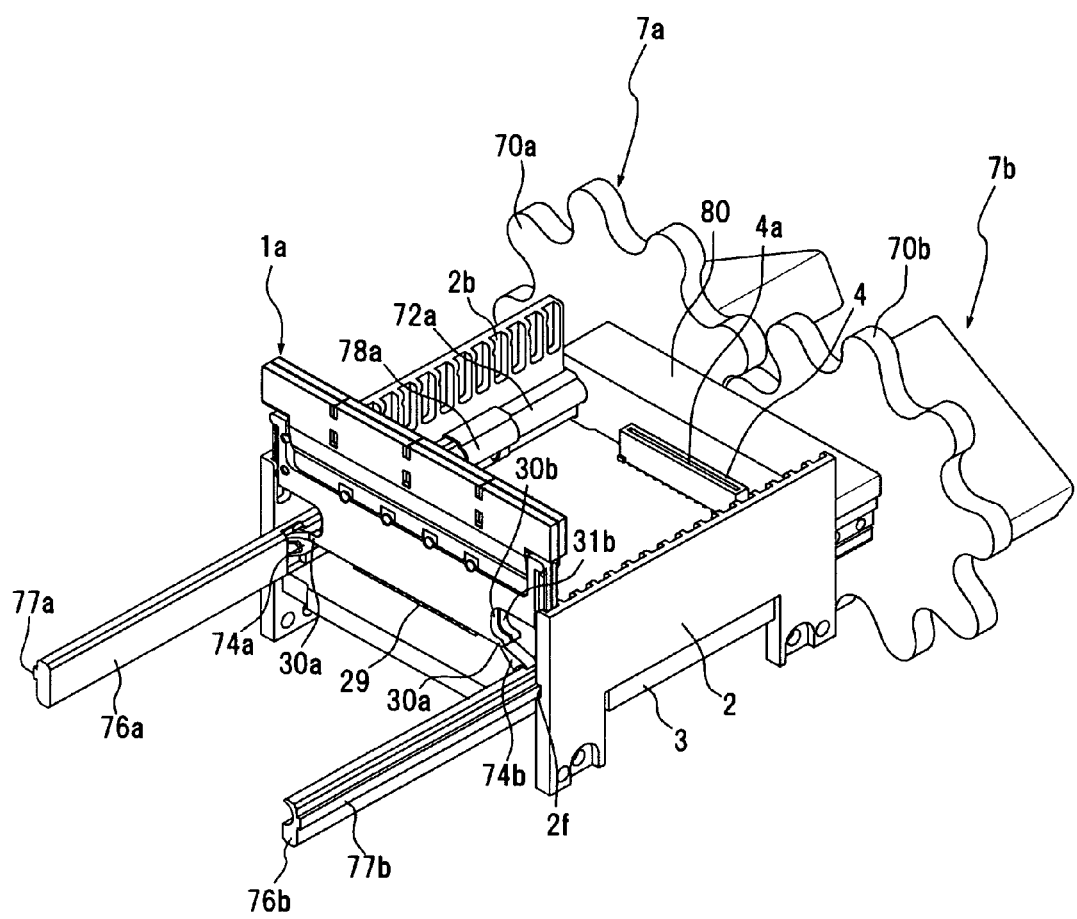
FIG. 4A is a perspective view of the radiation detector pulled out from the radiation detector stand by using the radiation detector attaching and detaching device in the embodiment according to the invention.
Figure 4B:
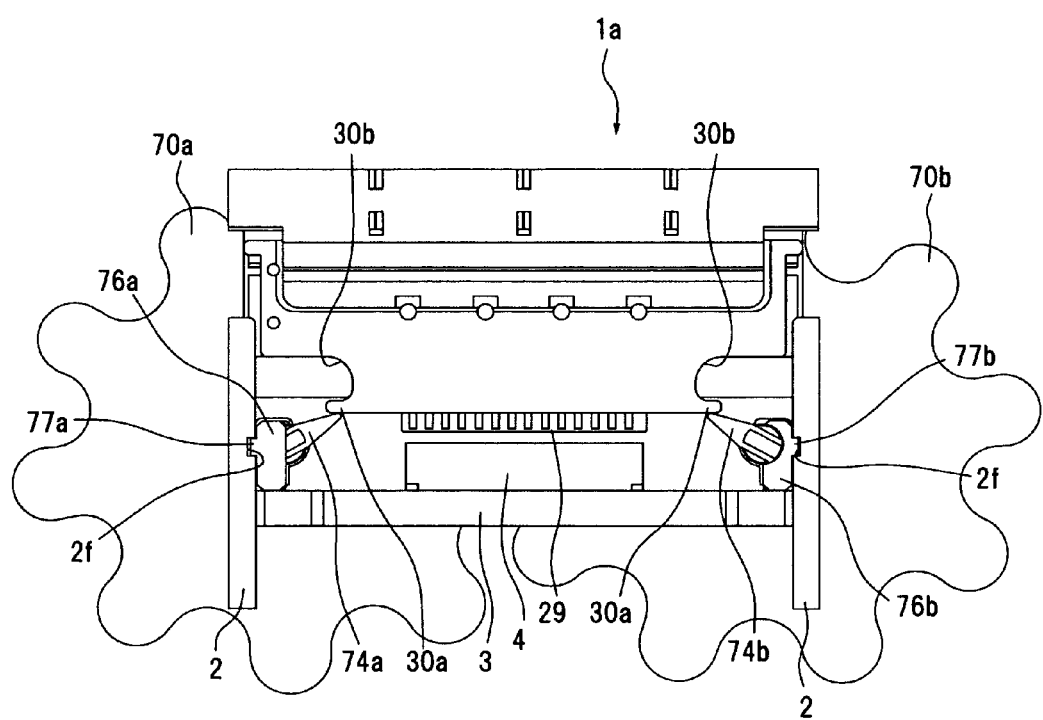
FIG. 4B is a front view of the radiation detector pulled out from the radiation detector stand in FIG. 4A which is viewed from the side of the radiation detector.

FIG. 4A is a perspective view of the radiation detector pulled out from the radiation detector stand by using the radiation detector attaching and detaching device in the embodiment according to the invention, and FIG. 4B is a front view of the radiation detector pulled out from the radiation detector stand in FIG. 4A which is viewed from the side of the radiation detector.

In FIG. 4A and FIG. 4B, a plurality of the radiation detectors 1 except the radiation detector 1a and the connector 4 to which the radiation detector 1a is inserted are omitted for convenience sake of explanation.

At first, the slide guides 76a and 76b of the radiation detector attaching and detaching devices 7a and 7b are inserted into the gap formed between the support 2 and a plurality of the radiation detectors 1 by means of the cutouts 30b and 31b of the radiation detectors 1. An insertion amount thereof is determined such that the rotational jigs 74a and 74b are located at positions where the radiation detector 1a to be pulled out from the radiation detector stand 6 is inserted. Herein, in the case where the slide guides 76a and 76b are inserted with a predetermined insertion amount, a rotation angle of the rotational gears 70a and 70b is adjusted such that the rotational jigs 74a and 74b are located beneath the projections 30a and 31a of the radiation detector 1.

Next, the rotational gear 70a as one rotational member is rotated under a state that the rotational jigs 74a and 74b respectively contact with a lower side of the projection portion 30a and a lower side of the projections 31a of the radiation detector 1a. In accordance with the rotation of the rotational gears 70a and 70b, the rotational jigs 74a and 74b rotate in a direction to be distant from the side of the support plate 3 along the trenches 2b of the supports 2, i.e. in a direction to pull out the radiation detector 1a. Thereby, the radiation detector 1a is pulled out from the supports 2.

Effect of the Embodiment

The radiation detector attaching and detaching devices 7a and 7b in the embodiment of the present invention comprise the rotational jigs 74a and 74b having the width corresponding to the width of the projections 30a and 31a of one radiation detector 1. According to this structure, it is possible to apply a force of pushing up or a force of pushing down to the projections 30a and 31a of the radiation detector 1 by the rotation of the rotational jigs 74a and 74b. Thereby, it is possible to selectively remove a particular radiation detector 1 from the radiation detecting apparatus 5 into which a plurality of the radiation detectors 5 are inserted, and to selectively insert the radiation detector 1 into particular trenches 2b of the radiation detector stand 6 by using the radiation detector attaching and detaching devices 7a and 7b.

By way of example only, even when a plurality of the radiation detectors 1 are aligned closely with an interval of 2.8 mm±0.02 mm, and a jig or the like cannot be inserted in a space between the respective radiation detectors 1, it is possible to securely insert and pull out only specific radiation detector 1. Therefore, in the case where malfunction occurs in the specific radiation detector 1 among a plurality of the radiation detectors 1 of the radiation detecting apparatus 5, it is possible to pull out only the specific radiation detector 1 to be replaced with a new radiation detector 1. Accordingly, it is possible to improve working efficiency and easiness in maintenance, and to reduce a maintenance expense.

In addition, since the radiation detector 1 comprises the cutouts 30b and 31b at the both sides of the card-edge 29, it is possible to insert the radiation detector attaching and detaching devices 7a and 7b comprising the rotational jigs 74a and 74b into the gap formed between the cutouts 30b and 31b and the supports 2. Thereby, it is not necessary to provide a further space for inserting the radiation detector attaching and detaching devices 7a and 7b, so that it is possible to effectively use the space.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A radiation detector attaching and detaching device, for a radiation detecting apparatus rising a plurality of radiation detectors for detecting radiation and a radiation detector stand for respectively maintaining the radiation detectors in trenches arranged with a redetermined interval, the device comprising:
   a pair of rotational jigs abutting against projections provided at both sides of each of the radiation detectors maintained in the radiation detector stand;
   a pair of rotational members configured freely rotatable, the rotational members comprising the rotational jigs; and
   a pair of support members respectively supporting the pair of rotational members,
   wherein the pair of support members are configured such that the pair of rotational members are attachable and detachable in a gap formed between the radiation detectors and the radiation detector stand by a cutout of each of the radiation detectors.

2. The radiation detector attaching and detaching device according to claim 1, wherein one of the pair of rotational members and an other of the pair of rotational members are provided to be rotatable in association with each other.

3. The radiation detector attaching and detaching device according to claim 2, wherein the pair of rotational jigs abut against projections of one of the radiation detectors in accordance with rotation of the pair of rotational members.

4. The radiation detector attaching and detaching device according to claim 3, wherein the pair of rotational jigs contacts with the projections of the one of the radiation detectors, and each of the rotational jigs is formed to have a width which does not contact with projections of an other radiation detector adjacent to the one of the radiation detectors.

5. The radiation detector attaching and detaching device according to claim 1, wherein each of the rotational members comprises a rotational gear connected to a rotational shaft, and each of the rotational jigs is rotated by the rotational shaft.

6. The radiation detector attaching and detaching device according to claim 1, wherein the rotational jigs abut against the projections from an upper side of the projections when inserting each of the radiation detectors, and the rotational jigs abut against the projections from a lower side of the projections when inserting each of the radiation detectors.

7. The radiation detector attaching and detaching device according to claim 1, wherein the radiation detector stand comprises a guide groove formed along a direction of disposing the trenches, and
   wherein each of the pair of support members includes a guide projection configured to slide along the guide groove.

8. The radiation detector attaching and detaching device according to claim 1, further comprising a pair of rotational shafts connected to the pair of rotational members to be freely rotatable in accordance with a rotation of the pair of the rotational members, respectively,
   wherein the pair of the rotational jigs is provided at an opposite side of the pair of rotational shafts with respect to the pair of rotational members.

9. The radiation detector attaching and detaching device according to claim 8, wherein the pair of rotational members, the pair of rotational shafts, and the pair of rotational jigs are integrally formed by a connecting member having a pair of through-holes, through which the pair of the rotational shafts respectively pass, while keeping an interval corresponding to the predetermined interval therebetween.

10. The radiation detector attaching and detaching device according to claim 1, wherein each of the plurality of radiation detectors comprises a substrate, a semiconductor device fixed on one end of the substrate, and a card edge portion provided on an other end of the substrate, and
    wherein the projections are provided on sides of both ends of the card edge portion, and the cutout is provided on the projections on a side of the other end of the substrate.

* * * * *